(12) United States Patent
Taylor

(10) Patent No.: US 8,733,653 B2
(45) Date of Patent: May 27, 2014

(54) CARD READER DEVICE

(75) Inventor: Michael Taylor, Dundee (GB)

(73) Assignee: NCR Corporation, Duluth, GA (US)

( * ) Notice: Subject to any disclaimer, the term of this patent is extended or adjusted under 35 U.S.C. 154(b) by 240 days.

(21) Appl. No.: 12/001,814

(22) Filed: Dec. 13, 2007

(65) Prior Publication Data

US 2009/0152354 A1 Jun. 18, 2009

(51) Int. Cl.
*G06K 7/08* (2006.01)

(52) U.S. Cl.
USPC .......................... 235/449; 235/379; 235/439

(58) Field of Classification Search
USPC ........ 235/493, 449, 379, 439; 902/31, 9, 4, 8, 902/27
See application file for complete search history.

(56) References Cited

U.S. PATENT DOCUMENTS

| | | | | |
|---|---|---|---|---|
| 4,510,381 A | * | 4/1985 | Fukatsu | 194/350 |
| 4,581,523 A | * | 4/1986 | Okuno | 235/479 |
| 4,803,349 A | * | 2/1989 | Sugimoto et al. | 235/475 |
| 4,902,882 A | * | 2/1990 | Lavelle | 235/382 |
| 5,796,083 A | * | 8/1998 | Kenneth et al. | 235/380 |
| 6,199,760 B1 | * | 3/2001 | Imai et al. | 235/480 |
| 6,491,216 B1 | * | 12/2002 | May | 235/375 |
| 2002/0060888 A1 | * | 5/2002 | Kanda | 360/323 |
| 2002/0113695 A1 | * | 8/2002 | Ernst et al. | 340/540 |
| 2004/0026507 A1 | * | 2/2004 | Nagata et al. | 235/449 |
| 2005/0116036 A1 | * | 6/2005 | Akahane et al. | 235/449 |

\* cited by examiner

*Primary Examiner* — Michael G Lee
*Assistant Examiner* — Tabitha Chedekel
(74) *Attorney, Agent, or Firm* — Harden E. Stevens, III

(57) ABSTRACT

A card reader device has a card entrance for receiving a card, such as an ATM card, a card enclosure in registration with the card entrance and defining an area in which the card is read, and a shutter for controlling access to the card enclosure from the card entrance. The card reader device also has a read head located in the card entrance for reading data from the card, and a controller for controlling the operation of the card reader device. The controller is operable to: (i) open the shutter in response to reading data from the card, and (ii) disable the read head when the shutter is opened.

18 Claims, 3 Drawing Sheets

CARD READER DEVICE

BACKGROUND

The present invention relates to a card reader device.

Card reader devices are typically used in self-service terminals, such as automated teller machines (ATMs), to enable a customer to identify himself/herself. One type of card reader device is a motorized card reader/writer (MCRW) device.

Bank customers can access funds from their accounts using an ATM card that typically has an associated personal identification number (PIN). Any user who presents a valid ATM card and enters the correct PIN associated with that card has immediate access to funds in an account controlled by that ATM card. This makes ATM cards vulnerable to theft and to more surreptitious attacks, such as duplication of the card by illicitly reading magnetic information stored on the card (referred to as card "skimming").

SUMMARY

It is an object of an embodiment of the present invention to reduce the possibility of card skimming.

According to a first aspect of the present invention there is provided a card reader device comprising: a card entrance for receiving a card; a card enclosure in registration with the card entrance and defining an area in which the card is read; a shutter for controlling access to the card enclosure from the card entrance; a read head located in the card entrance for reading data from the card; and a controller operable to: (i) open the shutter in response to reading data from the card, and (ii) disable the read head when the shutter is open.

The read head may be disabled prior to the card being transported. The read head may have been disabled immediately prior to opening the shutter so that the read head remains disabled when the shutter is open.

The card reader device may be a motorized card reader device.

The controller may disable the read head by short circuiting the read head.

The controller may short circuit the read head using a mechanical switch, such as a solenoid, to physically close a circuit. Alternatively, the controller may short circuit the read head using an electronic switch, such as a transistor-based circuit. Electronic switches typically have better reliability and lower power consumption than mechanical switches.

The card reader device may include a width switch for detecting the width of card presented at the card entrance, so that the controller only opens the shutter if the card has the correct width and has data that can be read by the read head.

The card reader device may further comprise a second read head located within the enclosure for reading data from the card for use with a transaction.

By virtue of this aspect of the invention, a card reader device is provided that disables the read head (sometimes referred to as a "pre-shutter read head") once data has been detected on the card. This is an important advantage because one known type of fraud involves drilling a hole in an ATM fascia to tap into the pre-shutter read head, and then intercepting the data read from a customer's card as the customer's card is transported over the pre-shutter read head. Since the main purpose of the pre-shutter read head is to sense that the customer's card is correctly oriented prior to opening the shutter, there are few disadvantages in disabling the pre-shutter read head once this has occurred.

According to a second aspect of the present invention there is provided a method of operating a card reader device to reduce fraud, the method comprising: receiving a card; sensing the presence of data on the card; opening a card transport path in response to sensing data; and disabling the read head when the card transport path is opened.

The method may further comprise the steps of: transporting the card into a secure reading enclosure; and reading the card within the enclosure.

The method may further comprise the steps of: ejecting the card from the secure reading enclosure; sensing removal of the card; and enabling the read head.

The step of sensing removal of the card may be implemented by sensing deflection of a width switch located in an entrance of the card reading device. Alternatively or additionally, sensing removal of the card may be implemented by ascertaining whether the shutter is open or closed, for example, using a shutter position sensor.

According to a third aspect of the present invention there is provided a self-service terminal including a card reader device according to the first aspect of the invention.

BRIEF DESCRIPTION OF THE DRAWINGS

These and other aspects of the invention will be apparent from the following specific description, given by way of example, with reference to the accompanying drawings, in which.

DETAILED DESCRIPTION

Figure 1:
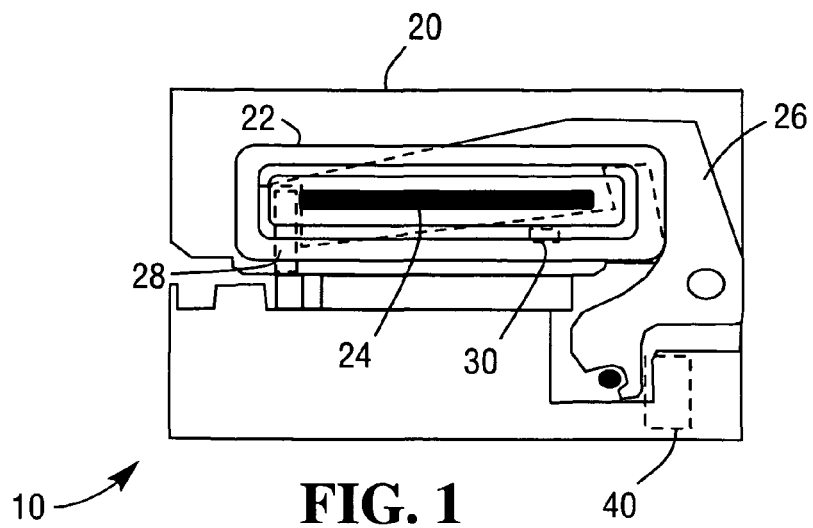
FIG. 1 is a front view of a motorized card reader device according to one embodiment of the present invention.
Figure 3:
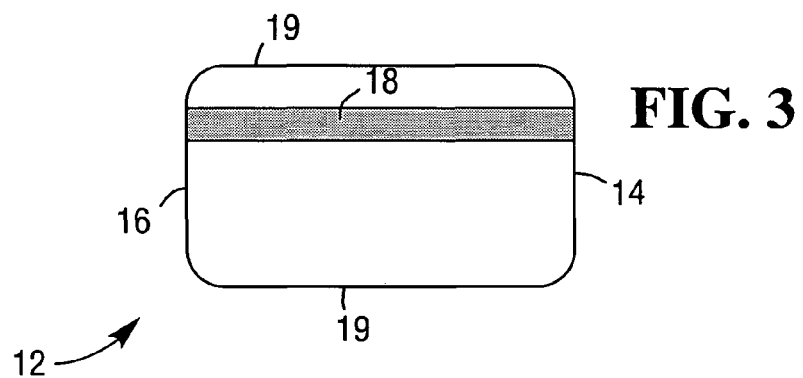
FIG. 3 is a rear view of a conventional magnetic stripe card for use with the device of FIGS. 1 and 2.

Reference is first made to FIG. 1, which is a front view of a motorized card reader device 10 (hereinafter "card reader") according to one embodiment of the present invention, and also to FIG. 2, which is a side view of the card reader 10. Reference is also made to FIG. 3 which is a rear view of a conventional magnetic stripe ATM card 12 for use with the card reader 10.

The ATM card 12 comprises a leading (narrow) edge 14 opposite a trailing (narrow) edge 16, and a magnetic stripe 18 extending from the leading edge 14 to the trailing edge 16 parallel to long edges 19.

The card reader 10 comprises a card enclosure 20 (in the form of a housing) coupled to a card entrance 22 (in the form of a throat portion). The throat portion 22 defines a slot 24 dimensioned for receiving the ATM card 12 leading edge 14 first. The throat portion 22 also includes a shutter 26 pivotally coupled to the housing 20 for controlling access from the throat portion 22 to the housing 20.

When the shutter 26 is in the open position, a card (such as ATM card 12) may be transported from the throat portion 22 to the housing 20; whereas, with the shutter 26 in the closed position no card may pass between the throat portion 22 and the housing 20.

Once the leading edge 14 of the ATM card 12 passes the shutter 26, the shutter 26 is released and biased against the top of the ATM card 12 so that the shutter 26 automatically closes once the trailing edge 16 of the ATM card 12 clears the shutter 26.

The throat portion 22 includes two sensors for verifying that an object inserted by the customer is actually a bank or credit card. The shutter 26 is only opened if the correct signals are received from both sensors.

The first sensor 28 is a card width detection sensor 28. This sensor 28 is deflected by the ATM card 12 on insertion and ejection of the card. If a customer inserts a card into the throat portion 22 then the card width sensor 28 detects the presence of this card.

The second sensor 30 is a pre-shutter read head, in the form of a magnetic flux detector. This sensor 30 is located at a point in the card entrance 22 over which the magnetic stripe 18 of the ATM card 12 should pass. The first sensor 28 verifies that the ATM card 12 has the correct width, the second sensor 30 verifies that the ATM card 12 is correctly oriented. If both sensors 28, 30 respond correctly to an inserted object (such as an ATM card 12) then the shutter 26 is opened, as will be described in more detail below.

The housing 20 also includes a shutter detect sensor 40 for detecting whether the shutter 26 is open or closed.

Figure 2:
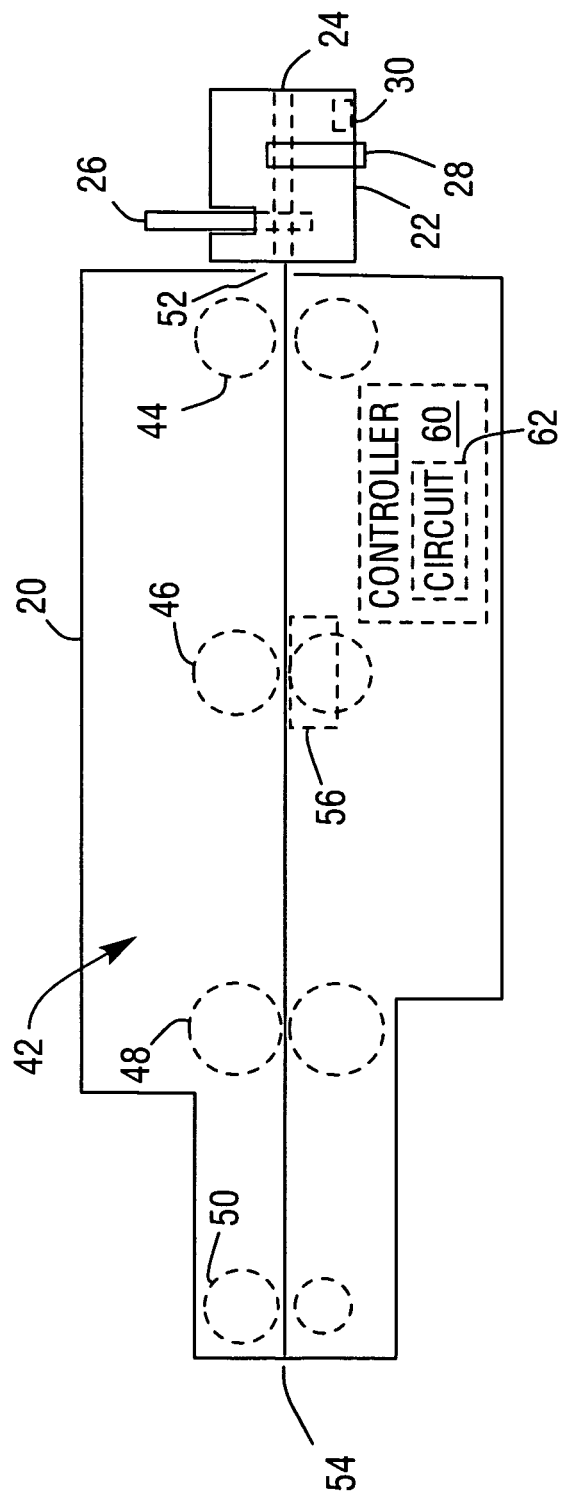
FIG. 2 is a simplified side view of the device of FIG. 1.

Referring specifically to FIG. 2, the housing 20 includes a linear transport mechanism 42 comprising four pairs of rollers 44, 46, 48, 50 and associated stretchable endless belts (not shown) for transporting the ATM card 12 when it is at least partially within the housing 20. The housing 20 defines an entrance/exit slot 52 at one end and a card retention slot 54 at the opposite end. The housing 20 also includes a card read/write head 56 for reading data from the ATM card 12 and writing data to the ATM card 12 as necessary. The housing 20 also includes multiple sensors (not shown) for accurately locating the position of the ATM card 12 within the housing 20. A controller 60 is also provided within, or coupled to, the housing 20 to control the operation of the other components of the card reader 10, such as the shutter 26, the sensors 28, 30, the linear transport mechanism 42, the read/write head 56, and the like.

Figure 4:
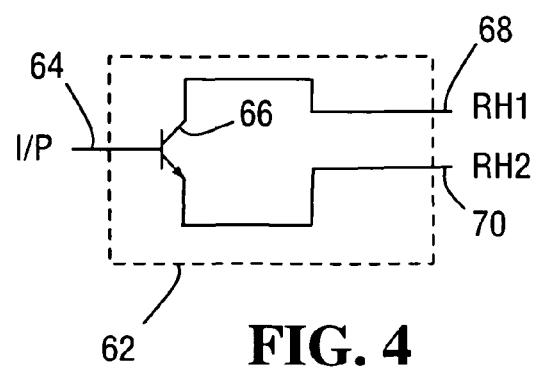
FIG. 4 is a schematic diagram showing a part (a disabling device) of the device of FIG. 1 in more detail.

The controller 60 includes a disabling device 62 for disabling the pre-shutter read head 30, as shown in FIG. 4. In this embodiment, the disabling device 62 is in the form of a simple transistor switching circuit. The circuit 62 has a switching input 64 from the controller 60, a transistor 66, and two outputs 68, 70 coupled to two output lines (not shown) from the pre-shutter read head 30. When the switching input 64 is activated by the controller 60, the transistor 66 is activated, allowing current to flow between the two output lines of the pre-shutter read head 30. This short-circuits the pre-shutter read head 30, thereby preventing the pre-shutter read head 30 from reading a magnetic stripe.

Figure 5:
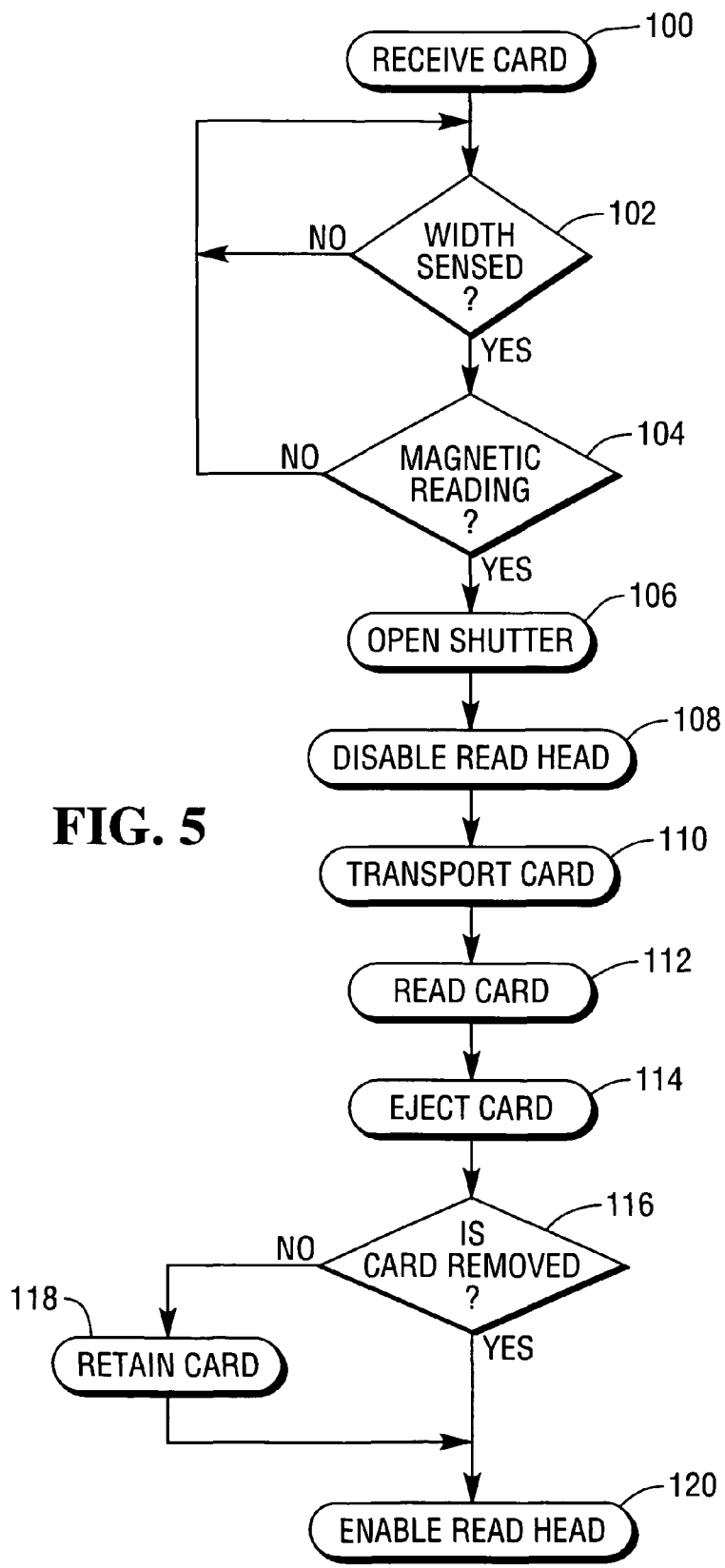
FIG. 5 is a flowchart illustrating the operation of the device of FIGS. 1 and 2.

The operation of the card reader 10 will now be described with reference to FIG. 5, which is a flowchart illustrating the steps involved in reading an ATM card 12.

Initially, a customer inserts an ATM card 12 into the throat portion slot 24 of card reader 10, so that the card reader 10 receives the ATM card 12 (step 100).

The controller 60 continually monitors the card width sensor 28 (step 102). If the card width sensor 28 is not deflected then the controller 60 takes no action. Insertion of the ATM card 12 deflects the card width sensor 28, which sends an output to the controller 60 indicating that the inserted object (the ATM card 12 in this example) has the correct width.

The controller 60 then ascertains if the pre-shutter read head 30 detects any magnetic flux (step 104). The pre-shutter read head 30 will detect magnetic flux on the ATM card 12 if the ATM card 12 is oriented correctly when it is inserted. If no magnetic flux is detected then the controller 60 takes no action. If magnetic flux is detected and the card width sensor 28 remains deflected then the controller 60 opens the shutter 26 (step 106).

The controller 60 then disables the pre-shutter read head 30 by activating the switching input 64 (step 108). This causes the transistor 66 to switch-on and short-circuit the pre-shutter read head 30.

Once the pre-shutter read head 30 has been deactivated, the controller 60 transports the ATM card 12 within the housing 20 (step 110) and allows the shutter 26 to urge against the top of the ATM card 12 so that when the ATM card 12 clears the shutter 26, the shutter 26 will automatically close.

Once the ATM card 12 is fully enclosed by the housing 20, and the shutter 26 is fully closed, the controller 60 reads the ATM card 12 for use in a transaction (step 112).

If a fraudster tries to intercept the signal from the pre-shutter read head 30, then no signal will be detected because the two output lines (not shown) from the pre-shutter read head 30 have been short-circuited.

The controller 60 then ejects the ATM card 12 (step 114) using the linear transport mechanism 42 to present the ATM card 12 to the customer.

The controller 60 ascertains if the ATM card 12 is removed by the customer (step 116), for example, by detecting closure of the shutter 26 using the shutter detect sensor 40.

If the customer does not take the ATM card 12 within a pre-determined time period (for example, fifteen seconds) then the card reader 10 transports the ATM card 12 to the card retention slot 54 for secure storage of the ATM card 12 (step 118).

If the customer does take the ATM card 12 then the controller 60 enables the pre-shutter read head 30 by de-activating the switching input 64 (step 120). This causes the transistor 66 to switch off, thereby open circuiting the pre-shutter read head 30. This leaves the pre-shutter read head 30 ready to detect magnetic flux on the next ATM card to be presented by a customer.

The card reader 10 can easily be incorporated into a self-service terminal, such as an automated teller machine (ATM), a non-cash kiosk, a self-checkout terminal, a check-in/check-out terminal, or the like.

It will now be appreciated that this embodiment has the advantage of reducing the possibility of a fraudster skimming a customer's card using the pre-shutter read head 30 because the pre-shutter read head 30 is disabled once the orientation of the customer's card has been confirmed.

Various modifications may be made to the above described embodiment within the scope of the invention, for example, the disabling device may be a different type of circuit. For example, a solenoid may be used so that mechanical movement of the solenoid opens and closes a circuit. In other embodiments, other types of mechanical, electronic, or optical switching circuits could also be used. Suitable electronic circuits are provided in basic electronic engineering textbooks, such as "The Art of Electronics", Horowitz P., and Hill W., Cambridge University Press; $2^{nd}$ edition (Jul. 28, 1989).

In other embodiments different types of card readers may be used to that described. For example, a dip card reader may be used.

In other embodiments, the controller 60 may ascertain if the ATM card 12 is removed by the customer using some other mechanism, for example, by detecting non-deflection of the card width detection sensor 28 or by detecting closure of the shutter 26.

In other embodiments, the card enclosure 20 and the card entrance 22 may be portions of a unitary device instead of being separate components coupled together.

In other embodiments, any convenient card may be read by the card reader device, such as a loyalty card, a credit card, an identification card, or the like.

The invention claimed is:

1. A card reader device comprising:
   a card entrance for receiving a card including a first read head for detecting data stored by the card;
   a card enclosure in registration with the card entrance and defining an area in which the card is read including a second read head;
   a shutter for controlling access to the card enclosure from the card entrance; and
   a controller operable to: (i) open the shutter in response to receiving the data from the card from the first read head, and (ii) disable the first read head by shorting the outputs of the first read head when the shutter is open while the card is in the card entrance to prevent subsequent reading of the data from the card by the first read head.

2. A card reader device according to claim 1, wherein the first read head is disabled prior to the card being transported.

3. A card reader device according to claim 1, wherein the card reader device comprises a motorized card reader device.

4. A card reader device according to claim 1, wherein the controller disables the first read head by short circuiting the first read head.

5. A card reader device according to claim 4, wherein the controller short circuits the first read head using a mechanical switch.

6. A card reader device according to claim 4, wherein the controller short circuits the first read head using an electronic switch.

7. A card reader device according to claim 1, wherein the card reader device includes a width switch for detecting the width of card presented at the entrance, so that the controller only opens the shutter if the card has the correct width and the first read head detects the data.

8. A method of operating a card reader device to reduce fraud, the method comprising:
   receiving a card;
   sensing the presence of data on the card by a first read head adjacent to the card;
   opening a card transport path into an enclosure containing a second read head in response to the first read head sensing data; and
   disabling the first read head by shorting the outputs of the first read head when the card transport path is opened while the card is adjacent to the first read head to prevent subsequent reading of the data from the card by the first read head.

9. A method according to claim 8, wherein the method further comprises:
   transporting the card into the secure reading enclosure; and
   reading the card within the enclosure by the second read head.

10. A method according to claim 9, wherein the method further comprises:
    ejecting the card from the secure reading enclosure;
    sensing removal of the card; and
    enabling the first read head.

11. A method according to claim 10, wherein the step of sensing removal of the card may be implemented by sensing non-deflection of a width switch located in an entrance of the card reading device.

12. A method according to claim 10, wherein the step of sensing removal of the card may be implemented by sensing closure of the card transport path.

13. A card reader device comprising:
    a card entrance for receiving a card including a first read head for providing an output signal which is indicative of magnetic flux being detected;
    a card enclosure in registration with the card entrance including a second read head, the card enclosure defining an area in which a magnetic stripe of a card can be read by the second read head;
    a shutter movable between an open position and a closed position to control access to the card enclosure from the card entrance; and
    a controller arranged to (i) monitor the first read head for the output signal which is indicative of magnetic flux associated with the magnetic stripe of the card being detected, (ii) move the shutter from the closed position to the open position in response to the first read head providing the output signal which is indicative of magnetic flux associated with the magnetic stripe of the card being detected, and (iii) short circuit the first read head to disable the first read head when the shutter is open while the card is in the card entrance to prevent subsequent reading of data from the magnetic stripe by the first read head.

14. A card reader device according to claim 13, wherein the first read head is short circuited prior to the card being transported.

15. A card reader device according to claim 13, wherein the card reader device comprises a motorized card reader device.

16. A card reader device according to claim 13, wherein the controller short circuits the first read head using a mechanical switch.

17. A card reader device according to claim 13, wherein the controller short circuits the first read head using an electronic switch.

18. A card reader device according to claim 13, further comprising a card width detector for detecting width of the card presented at the card entrance, the controller arranged to move the shutter from the closed position to the open position only if the card width detector detects a correct width of the card and the first read head detects the magnetic flux associated with the magnetic stripe of the card.

* * * * *